United States Patent [19]
Venkateswar et al.

[11] Patent Number: 5,461,410
[45] Date of Patent: Oct. 24, 1995

[54] GRAY SCALE PRINTING USING SPATIAL LIGHT MODULATORS

[75] Inventors: Vadlammanti Venkateswar, Dallas; James St. Clair, Richardson; William E. Nelson, Dallas, all of Tex.

[73] Assignee: Texas Instruments Incorporated, Dallas, Tex.

[21] Appl. No.: 38,391

[22] Filed: Mar. 29, 1993

[51] Int. Cl.[6] .................................................. H04N 1/21
[52] U.S. Cl. ................................ 347/240; 358/298
[58] Field of Search .................................. 346/108, 76 L, 346/1.1, 166; 358/298, 296, 300, 302; 345/84, 204; 347/239, 240

[56] References Cited

U.S. PATENT DOCUMENTS

4,638,308  1/1987  Ott ................................. 345/84

Primary Examiner—Mark J. Reinhart
Attorney, Agent, or Firm—Julie L. Reed; James C. Kesterson; William E. Hiller

[57] ABSTRACT

A method for gray scale printing combining row integration and pulse width modulation. A spatial light modulator (102) has one line (104) designated to perform PWM within a given line time. Another area of the modulator (106) has lines designated to perform row integration on the print image, allowing for more gray levels. An additional area (108) can be designated to correct for defects in the illumination profile and the printed images.

6 Claims, 8 Drawing Sheets

GRAY SCALE PRINTING USING SPATIAL LIGHT MODULATORS

BACKGROUND OF THE INVENTION

This application is being concurrently filed with the following applications: "COMBINED MODULATOR SCHEME FOR SPATIAL LIGHT MODULATORS," Ser. No. 08/038,392; TI-17335; and "PROCESS AND ARCHITECTURE FOR DIGITAL MICROMIRROR PRINTER," Ser. No. 08/038,398; TI-17632.

1. Field of the Invention

This invention relates to printers using spatial light modulators (SLMs), more particularly to gray scale printing using SLMs.

2. Background of the Invention

Achieving gray scale with a spatial light modulator presents several difficulties. One occurs when using binary SLMs, whose elements can only be either ON or OFF. In printing systems, that means either the photosensitive media either receives light from that element or not. If it does not receive light, the drum does not pick up any toner, and the resulting page remains blank (white) at that spot. If the photosensitive media does receive light, the drum picks up toner and the resulting page becomes black at that spot. In most binary SLMs, there exists no way to expose a photosensitive media so as to pick up a lesser amount of toner in an analog-fashion.

Laser printing systems can achieve gray scale by modulating the light in an analog fashion, typically using the power of the laser. However, laser systems cannot normally modulate in this analog fashion fast enough to achieve more than a minimum number of gray levels. Laser scanning systems print pixel-by-pixel by scanning the laser beam along raster lines. For example, the user wants to print an 8.5" by 11" paper with 600 dots per inch (dpi) at 40 pages per minute. Each page requires 11"×600 dpi, or 660 lines. At 40 pages per minute this equals 4400 lines per second, where each line has 8.5×600, or 5100 pixels. This requires $22.44 \times 10^6$ pixels per second, allowing 44.6 nanoseconds per pixel. Lasers cannot modulate fast enough in an analog fashion to give gray-scale exposure during the short pixel time. Some SLMs have this capability.

SUMMARY OF THE INVENTION

The present invention disclosed herein comprises a method of using a spatial light modulator to achieve gray scale printing. One embodiment of the invention comprises using symmetrical pulse width modulation on one row of a binary spatial light modulator, and using the other rows for row integration.

It is an advantage of the invention that many levels of gray scale are achieved with high resolution. It is a further advantage that the pulse width modulation can rapidly occur within the line times of a moving photosensitive media. It is a further advantage that the data rate to load the device is maintained at manageable rates. It is a further advantage that it provides a method for compensating for defects in the array.

BRIEF DESCRIPTION OF THE DRAWINGS

For a more complete understanding of the present invention and for further advantages thereof, reference is now made to the following Detailed Description taken in conjunction with the accompanying Drawings in which:

FIGS. 2a–2e illustrate the movement of data on the face of the device within the lines of elements.

DETAILED DESCRIPTION OF THE PREFERRED EMBODIMENTS

Pulse width modulation (PWM) typically occurs in displays to achieve gray scale and color shading. Generally, PWM entails weighting the data bits by significance and displaying those bits for lengths of time corresponding to their weight. For example, in a 4-bit system, the system displays the most significant bit (MSB) for ½ the total frame time, typically around 16 milliseconds. The next-most significant bit receives ¼ the total frame time, the next bit ⅛, and the least significant bit 1/16 of the total frame time. Display systems rely upon the viewer's eye to integrate these pulses into a shade of gray, or a color. Printing systems are not restricted to integer levels of PWM, as will discussed further. It is possible in printing to get "fractional" gray levels, not possible with PWM, where the gray level is a fraction of the least significant row integration time.

In printing, the frame time is replaced by a line time. The line time is the amount of time it takes for the distance of one line to pass by the SLM on the photosensitive media. The times are typically much shorter and therefore allow less time to load the device. The devices normally display one set of data while the next set of data loads into the device, preparing for a reset signal.

In some SLMs, such as the digital micromirror device (DMD) (also known as a deformable mirror device), a reset pulse allows each element in an array of mirrors to react to the new data in its addressing circuitry, updating the element to reflect the new data. For example, assume the element is in the ON position. While it is displaying the data, OFF data loads onto the addressing circuitry. When the reset pulse occurs, the element will register the new data and turn OFF. Of course, ON data can be followed by ON data, and OFF data can be followed by OFF data, in which cases the elements do not change states to reflect new data. This reset process usually requires loading the entire device before reset occurs, requiring high data rates.

Because of the time constraints, insufficiency of light transfer, and the high data rates required to load within the time constraints, then, it is difficult to utilize pulse width modulation in printing at a level that allows for a significant number of gray levels.

However, one of the advantages of using a spatial light modulator with individual elements is the ability to set aside or designate lines of elements to perform certain differentiated functions. In one embodiment of the present invention, one row of a multiple row spatial light modulator does PWM. Therefore, only one row of data needs to be updated quickly, allowing the data on the other lines to be latched and held during that one row's reset periods.

This approach can then combine with row integration, a prior art technique where the data line "tracks" or follows the same area of the photosensitive media by moving up or down the modulator face, whichever way the drum is moving relative to the modulator. The data can be ON or OFF a certain number of lines allowing achievement of gray levels. A 16-line row integration allows 16 levels of gray, not including the option the data being OFF (white) on for all lines. The space could be on for all 16 lines, or 15 lines, and so on.

In the combination of the two, for example, one line of 2-bit PWM allows for 4 possible gray levels. With 128 lines of row integration, 4 gray level possibilities combined with 128 gray level possibilities equals 128×4, or 512 gray levels. The most typical interpretation is that the row integration provides the integer gray levels, and PWM provides the "fractional" gray levels, where the fractional gray levels are fractions of the least significant row integration gray level. The 512 gray levels are what will be called actual gray levels. A comparison of techniques of achieving these levels is shown below.

For example, the addition of 2 bits of PWM to 128 row integration levels to achieve 512 gray levels requires only a 1.02 times increase in the average data rate relative to the simple 128 rows of row integration case. If the 512 levels are to be achieved through row integration only, the data rate increases by a factor of four.

In the following table, a device width of 500, 5 inches/sec print speed is assumed, with a print density of 600 dpi, and 48 inputs. The data rate is calculated as follows:

*Average data rate= Device Width (500)×Effective Depth×Print Speed (5 inches/sec)×Print Density (600 dpi)÷#of inputs (48).*

| Variant | Gray Scale Factor | Effective Depth | Average data rate (MHz) | Peak data rate (MHz) |
|---|---|---|---|---|
| RI only | $n_I = 7$ | $2^{n_I}$ | 4 | 1X |
|  | $n_I = 9$ | $2^{n_I}$ | 16 | 4X |
| PWM entire device + RI | $n_I = 7$ $n_p = 2$ | $2^{n_I} \times n_p$ | 16 | 4X |
| PWM one row + RI | $n_I = 7$ $n_p = 2$ | $2^{n_I} + n_p$ | 4.0625 | 2X |
| PWM one row only | $n_p = 9$ | $n_p$ | .28125 | 4X |

$n_I$ = number of row integration bits;
$n_p$ = number of PWM bits
RI = Row integration
Peak data rate is relative only Row Integration (RI) only at $n_I = 7$ As can be seen above, when PWM is applied to the entire device, the data rate is much higher than that of PWM only on one row. Usually, the average bandwidth is not as important as the peak bandwidth, which places the highest demand on the loading circuitry. For the row integration only case, the peak data rate is the same as the average data rate. If, for example, the device had 128 rows, and the designer desired 512 gray levels. One possibility is to use a 512 line row integration array, increasing the bandwidth by a factor of 4.

Alternatively, one could use a scheme that does 2 bits PWM on the entire device, increasing the bandwidth by $2^n$ as the entire device has to be updated in the PWM LSB time. If only one row were pulse width modulated, the peak data rate would be only 2 times higher than above, because the entire array needs to be updated in the PWM MSB time, which is ½ the row integration unit time. If one row of PWM were to provide all 9 bits of gray scale (with no row integration) the data rate would be 4 times the 7 bit row integration case, because one line need to t be updated in the PWM LSB time ($\frac{1}{2}^{n_p}$ of the line time). A more serious problem exists for the 1 row PWM example, because the light source needs significantly more power to generate sufficient exposure in the short line time. The above numbers are only one example of such data rates, since the number of PWM bits and row integrations rows can be selected by the designer.

Other ways of combining row integration and PWM are possible. For example, in one scheme for 512 gray levels 128 levels are achieved through row integration and 4 through PWM. There are 128+ 1, or 129 rows of the SLM required. Every 128 row integration steps the top 128 rows are pulse width modulated while the 129th row continues row integration. This cycle is repeated. The average bandwidth is the same as for the single PWM case, but the peak rate is $2^{n-1}$ times the baseline.

However many of actual gray level achieved, the number of gray levels seen by the human eye, or perceived gray levels, may be much less. The eye can only perceive so many shades of gray. It may only see one perceived level between actual gray levels 412 and 512. Other limiting factors on gray levels occur with the toner and the organic photoreceptor (OPC). Depending upon the density of the toner, level 412 may saturate with toner, and therefore result in a level no different than level 512. The OPC has a discharge curve, and after a certain level of energy transfer, the OPC registers no differently past that level.

Another factor is the non-linearity of the entire print process. An input image, for example, from a computer or a scanner, may have 256 gray levels. When this data is processed for input to the print engine, the non-linearity may result in some of those gray levels appearing to be very "close" in shading and others being far apart. One possible way to correct for this would be with a look-up table, where certain gray levels perceived by the input would be mapped to a certain output level, that has been predetermined by using the characteristics of the printer.

Figure 1:
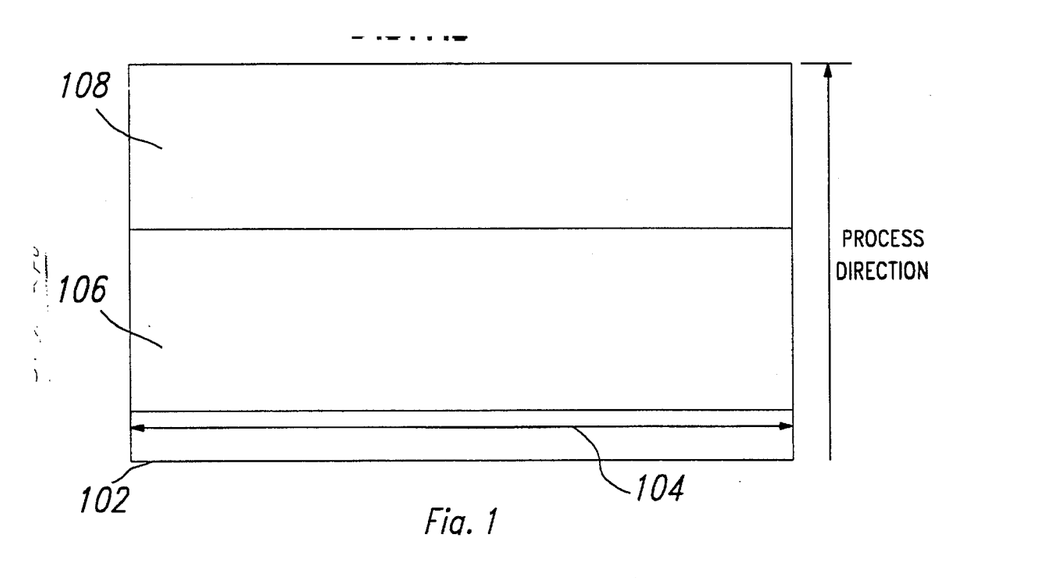
FIG. 1 shows a block representation of a row of pulse width modulation on the face of a binary spatial light modulator, with row integration and corrected row integration areas.

FIG. 1 shows an illustration of how the lines are allocated on the face of an SLM. This example shows 4-bits PWM with 128 lines of row integration, but can adapt to specific system and application needs. Line 104 is the designated row for PWM. This line can actually occur anywhere in the array. It may be desirable to use one particular line of elements, especially if it has no defects. Indeed, the row integration row is not limited to physical rows on the device. Depending upon the addressing structure of the device, and such features as split reset, two or more rows could be used to form one "logical row" for PWM. The row integration area 106 is showing occurring after it in the process direction, shown by the arrow, but could also be arranged around the PWM line, or before it. Above row integration area 106 is the correction row integration area 108.

This region would more than likely be at the end of the array in the process direction, to allow for defect correction occurring in earlier lines. One such correctable defect may result from inoperable cells within a given row. The correction region could be used to duplicate the position and energy transferred from the inoperative cell at a later time, thereby correcting the loss of energy transferred. This and other method of utilizing the correction area could be handled by a look-up table that was preloaded with the corrections, and accessed as necessary.

Figure 2C:
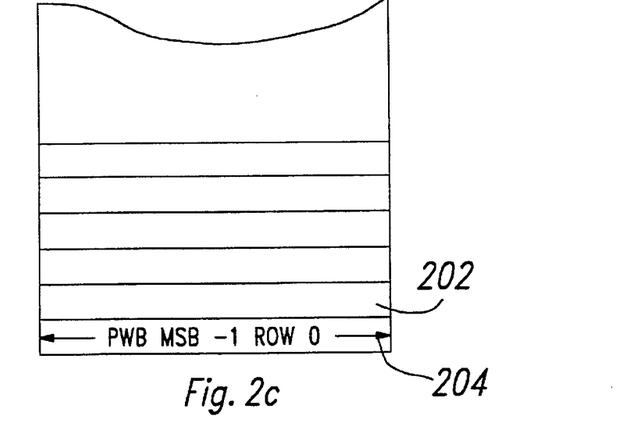

To keep the data rates at a minimum and allow the device to reload data, the data moves as shown in FIGS. 2a–2e. In FIG. 2a, line 204 of the modulator 202 displays the LSB of row 0. In this device configuration, this would occur at the very beginning of the process and would be the first line on the paper. The natural order of PWM normally displays the MSB of the PWM data first. However, in this embodiment the row integration data remains the same for all of the PWM intervals, and the entire device is updated during the last PWM period. If PWM occurred in the natural order, the entire device would have to be updated in the LSB time, which for a 4-bit system, is only 1/16 the line time. If the MSB is done last the device update time will be 1/2 the line time.

Figure 3:
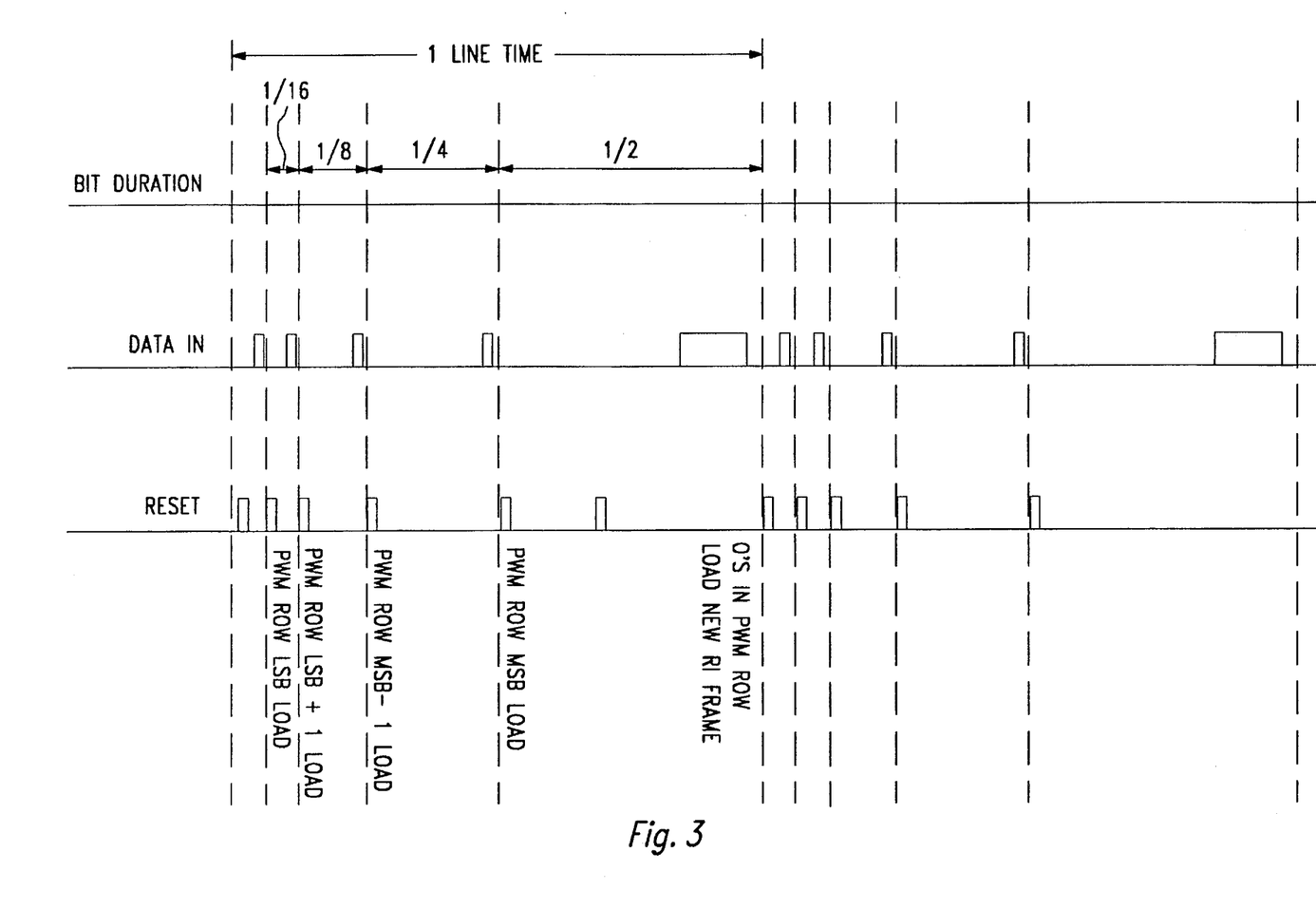
FIG. 3 shows a timing diagram of the data load and reset sequences.

FIG. 3 shows the timing diagram for the above sequence. The top row shows the bit duration for binary time slices. Since the continuous division of the time never really reaches a full time period, there is an inactive energy transfer time for the PWM row shown just to the left of the 1/16th time period, in this embodiment. At the end of this inactive time the data is being loaded as shown on the line labelled "PWM ROW LSB LOAD." Note that only data for the PWM row or rows must be loaded here. The sequence continues much as discussed above. One special part to note is at the end of the 1/2 bit duration time, the data load pulse is shown as considerably longer than the others. This occurs because of the loading of the row integration data as well as the PWM row being set to zero for the next inactive time. The bottom line of the timing diagram shows the occurrence of the reset pulses that allow the PWM row to register its new data, and the entire device to register its new data at the beginning of the next line time.

Figure 2D:
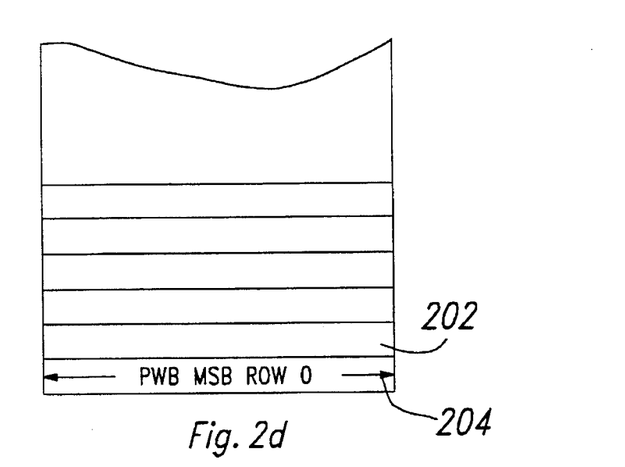

FIGS. 2b–2d show the pulses for PWM on line 204. In FIG. 2e, the line next to the PWM row now begins the row integration for row 0, and the PWM line starts using the data for the next row. Just before this picture, the entire device was updated. The new data for PWM of row 1 loaded onto line 204 and the data for row integration for row 0 loaded onto line 206.

This process continues for the entire page length. The data changes on the PWM line 204 every update period, but the data on the rest of the device only updates every 4 periods, and the periods are not of the same length. On a device with 1 line of PWM and 128 lines of row integration, the data for row 0's 128th exposure would be at the top of the row integration region on the modulator while the PWM data for row 128 would be loaded into line 204.

Figure 4:
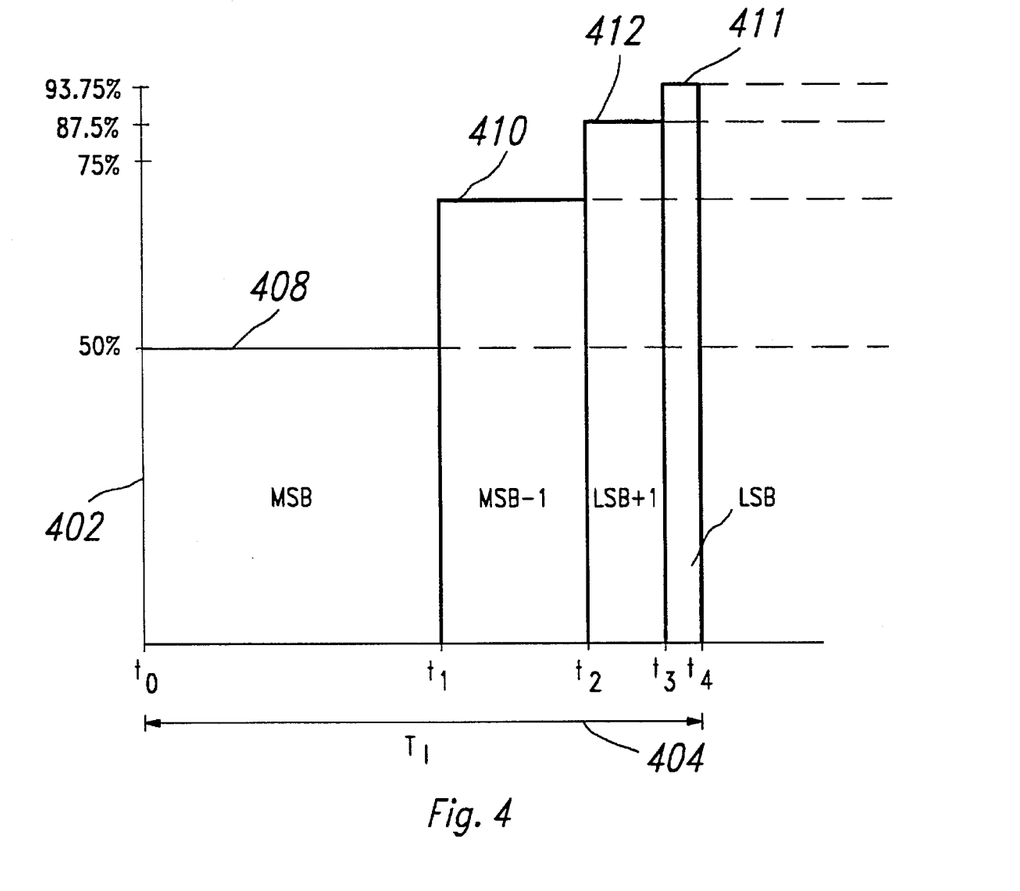
FIG. 4 shows a bar graph of the exposure times.

The exposure bar graph for this process is shown in FIG. 4. Axis 402 is the percentage of the total energy impinged on the photosensitive media in one row integration time for an ON element. The arrow 404 shows the length of one time interval for the row integration data update. Line 408 shows that in 1/2 the designated time, the photosensitive media receives 50% of its energy. Line 410 adds another 25% energy to the dot image in 1/4 the total line time, for a total of 75% of its energy. Lines 412 and 414 show the addition of another 12.5% energy and another 6.75% energy, respectively.

Figure 5A:
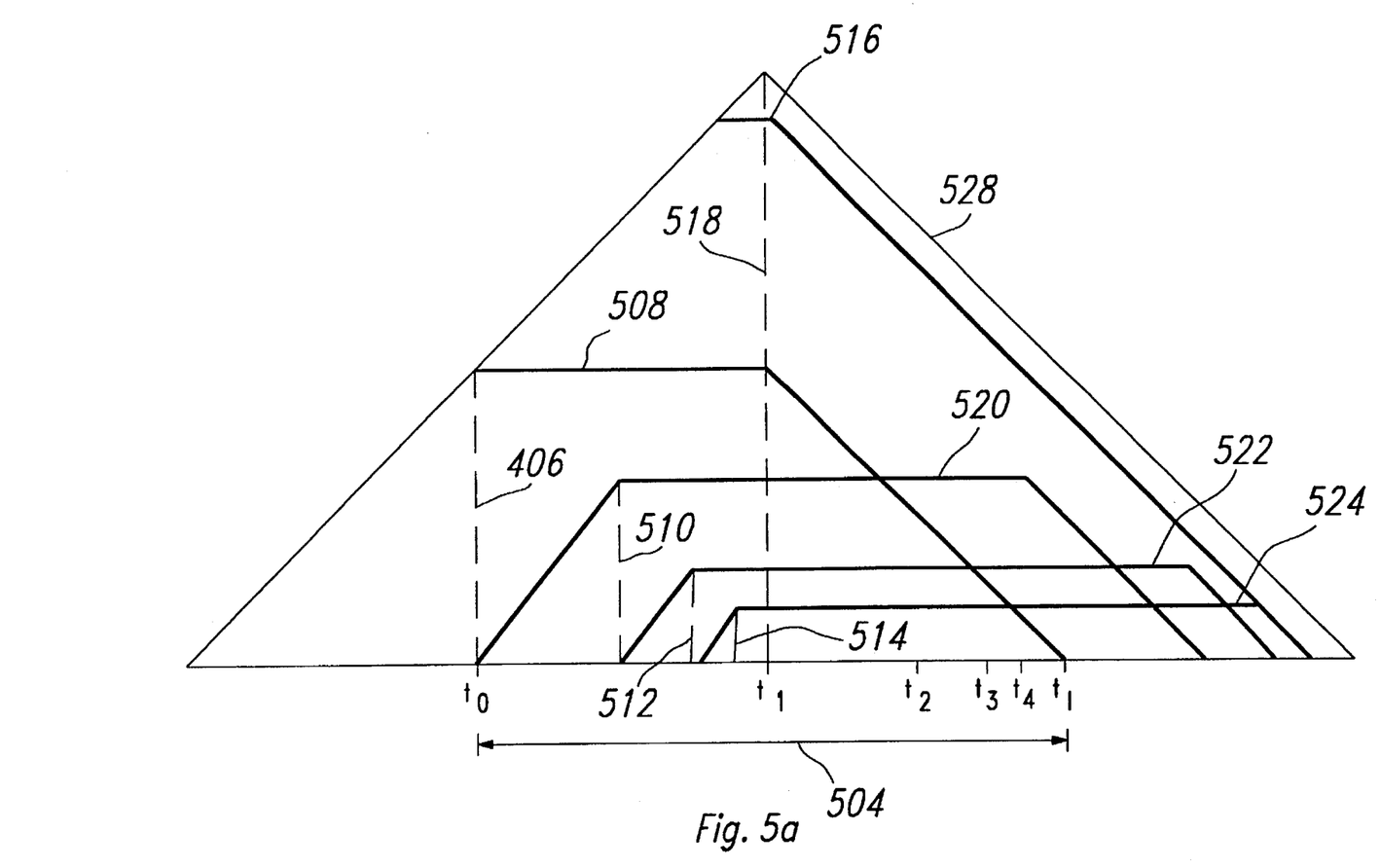
FIGS. 5a–5c show exposure profiles resulting from binary pulse width modulation.

FIG. 5a shows the exposure profile 502 for a binary pulse width modulating scheme. Note that the effects of the photoinduced discharge curve and the optical point spread function are not shown, but the effect of the blur caused by the movement of the media is shown. The movement of the medium results in a trapezoidal exposure profile instead of a rectangular.

Suppose the duration of the exposure is a fraction f of the line time. This results in a trapezium with a bottom leg that equals (1+f) times the cell length, and a top leg that is (1−f) times the cell length. The cell length is 1/600th of an inch for 600 dpi printing. The height of the trapezium is proportional to f, as is its area. For example, if the fraction f is 0, corresponding to instantaneous exposure, the trapezium becomes a rectangle, as is expected.

Arrow 504 shows 1/600th of an inch, or one "dot" in 600 dpi printing. Between $t_0$ and $t_1$, MSB 508 is printed, between $t_1$ and $t_2$, MSB-1 520 is printed and the process continues. The line 516 shows the overall profile for all bits ON, since at that point all 4 PWM bits, 508, 520, 522, and 524 are ON. The line 528 shows the profile of a row integration element that is ON for the entire line time. MSB 508 has 50% of the area 528, MSB-1 520 has 25% of the area, LSB+1 522 has 12.5% of the area, and the LSB has 6.25% of the area. Note that the exposure profile of one row integration elements that is ON spans two 600 dpi dot lengths. This leads to overlap of the profiles of pixels in the process direction. One way to reduce the overlap/spread of profiles is to pulse the light source ON and OFF, resulting in an exposure time that is a fraction of the line time. Binary PWM provides 16 levels from 4 reset pulse, occurring at $t_0$–$t_4$.

Figure 5B:
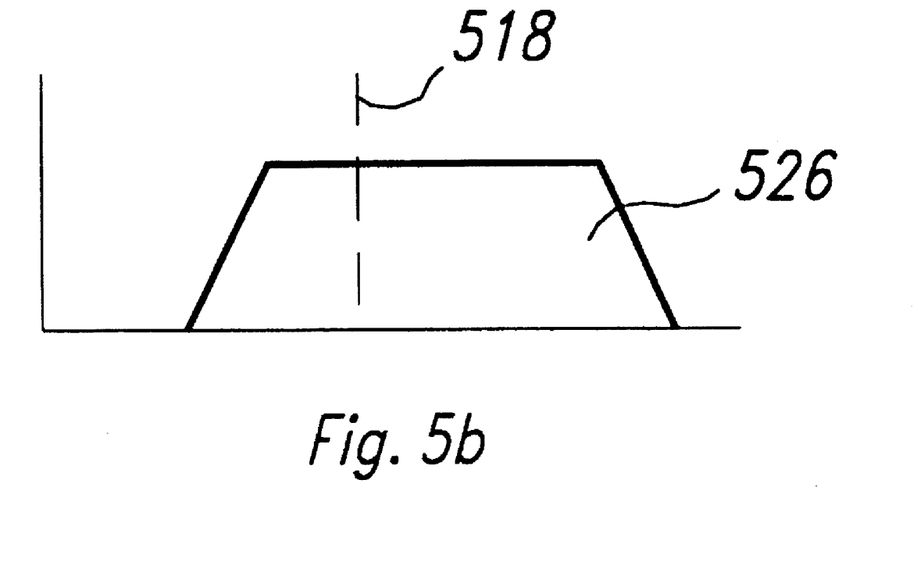
Figure 5C:
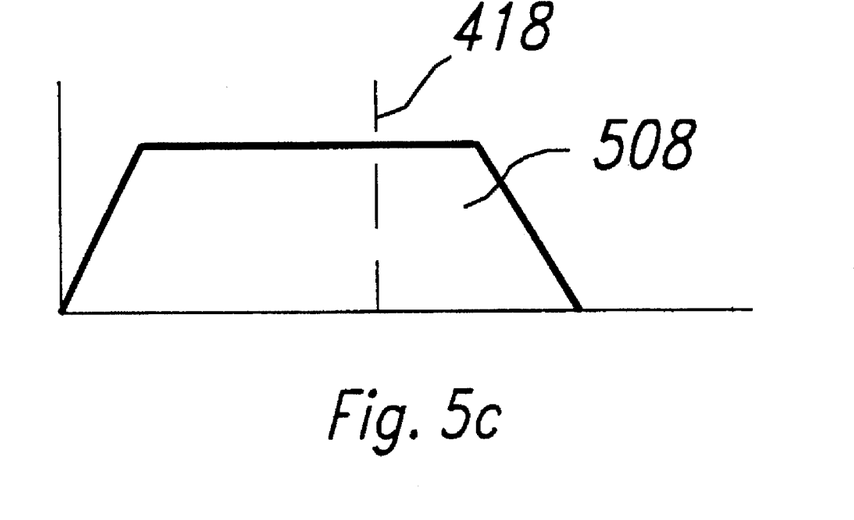

One disadvantage of the PWM scheme described above is that it is not symmetric, i.e. the profiles generated for the different gray levels are not all centered around the same point. For example, FIG. 5b shows the profile for gray level 7, which is an addition of gray levels 4 (MSB-1), 2 (LSB+1), and 1 (LSB). FIG. 5c shows the profile for gray level 8 (MSB). Neither of them are symmetric with respect to the center line 518 of FIG. 5a. This could lead to visual artifacts as minor variations in gray levels will lead to positional shifts of the profiles.

Figure 6A:
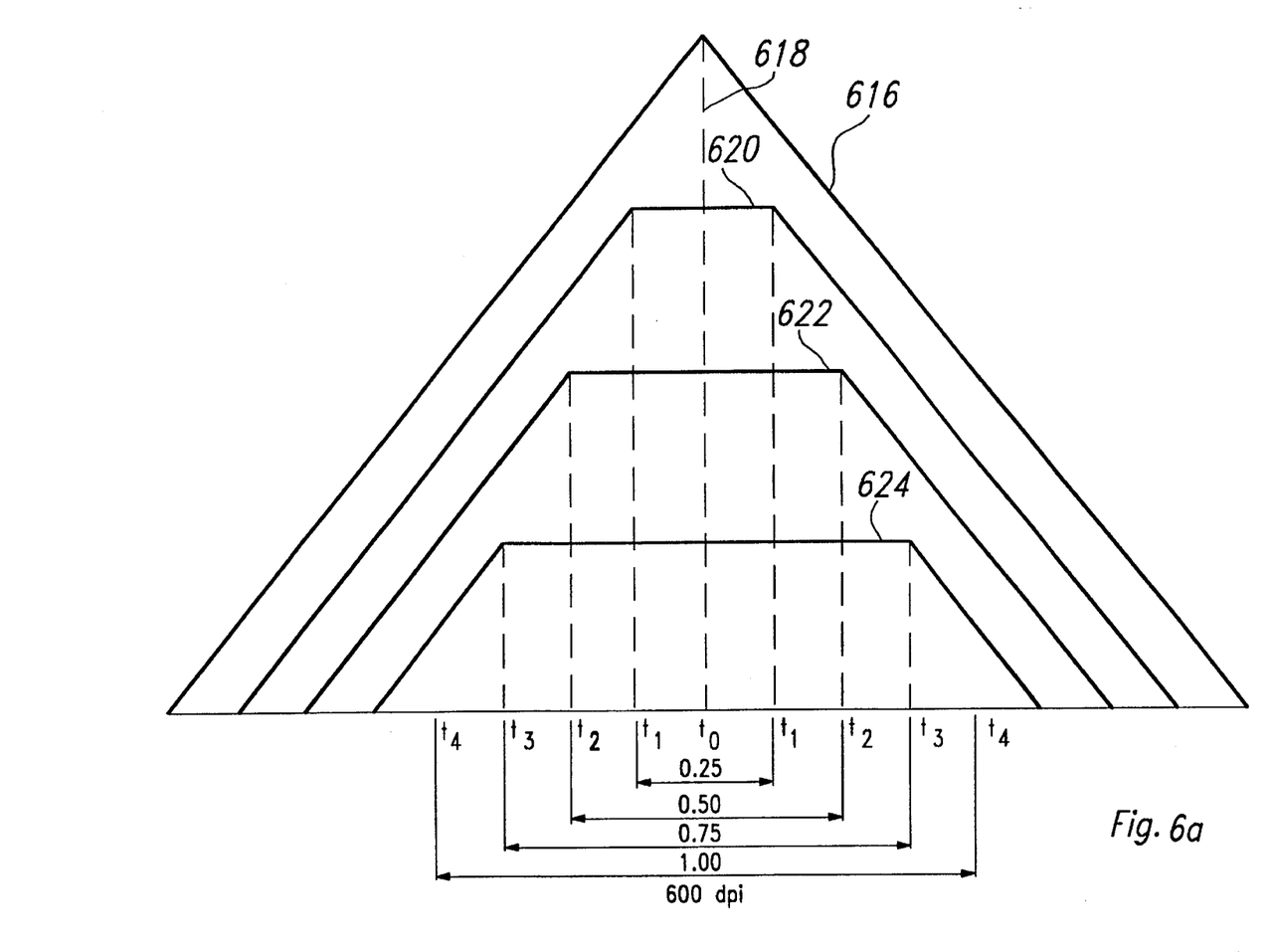
FIGS. 6a–6b show exposure profiles resulting from symmetric pulse width modulation.

One way to correct this is to use symmetric PWM. An embodiment of this is shown in FIG. 6a. In FIG. 6a, the gray levels are selected by the amount of time the elements are ON. However, fewer gray levels can be achieved (only 4 shown in FIG. 5a). Each element of the PWM row is only ON once, for whatever amount of time desired. The ON/OFF times are timed to remain symmetrical about the axis 618. The profile 616 is a triangle because the top leg of the triangle is 1 minus 1 time the cell length, which results in 0. Gray level #3 is shown by line 620, gray level #2 by line 622 and gray level # 1 by line 624. In this instance, only 4 gray levels are achieved with 6 resets. Each pixel is loaded with data that responds only to two of the six resets, which are at $t_{-3}$, $t_{-2}$, $t_{-1}$, $t_1$, $t_2$, and $t_3$.

To see how the fractional gray levels 0, 0.25, 0.5, and 0.75 are achieved, consider the case where a gray level of 0.5 is desired at a particular dot. The element corresponding to that dot is initially OFF. It is loaded with ON data at reset $t_{-2}$ and loaded with OFF data at reset $t_2$, resulting in the profile 622 at that dot. If gray level 0.75 were desired, the element would be loaded with ON data at time $t_{-3}$ and loaded with OFF data at $t_3$.

This approach could be extended to include several rows of symmetric PWM possibly generating different gray level sets. For example, one could add a second line of elements to the above example to have times of 0.35, 0.65, and 0.9. The profiles generated by the different tones can be superposed resulting in even more gray levels.

Note that this until this point, a reset pulse affecting the entire SLM, including the row integrated regions and the PWM line, has been assumed. If an SLM was available with separable resets and address decoders for each region, then the row integration bandwidth would be unaffected by PWM bandwidth. Since PWM requires updating only a few lines, the peak bandwidth will be decided solely by the row integration region.

Figure 6B:
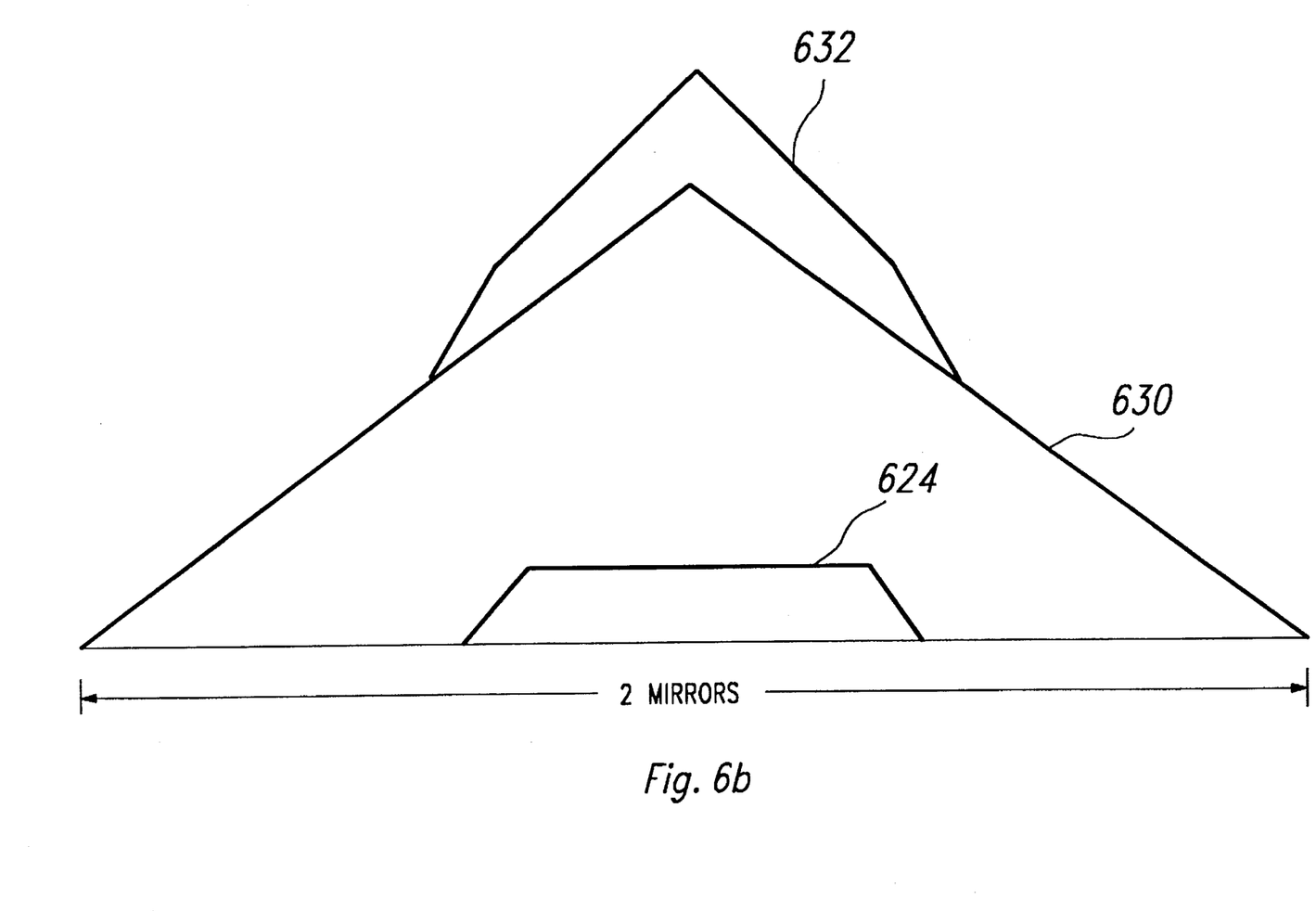

The overall resulting print exposure profile showing the effect of the combination of PWM and row integration is in FIG. 6b. The row integration created the profile 630. The PWM profile is shown solely by line 624, and line 632 shows the combination created by addition of both of them. Notice in all FIGS. 5 and 6, the length of the horizontal axis has been two elements, creating an overlap. The overlap can be controlled by turning OFF the row integration elements in less than a line time and PWM changed to be proportional to the row integration time, or decreasing the duty cycle of the source to less than 100%.

This approach has overall flexibility. Depending on the toner used, the SLM controller can adjust the PWM and row integration schemes to give fewer or more levels of gray. If the SLM starts to wear out, the line of the device performing the PWM could move to a different line with no defects, or the number of defect correction lines could be increased. Additionally, the data rates remain low so that a commercially available processor could perform the necessary data handling. It allows the possibility of achieving more gray scales than the human eye can perceive.

Thus, although there has been described to this point particular embodiments of gray scale printing it is not intended that such specific references be considered as limitations upon the scope of this invention except in-so-far as set forth in the following claims.

What is claimed is:

1. A method of operating a spatial light modulator to achieve gray scale printing comprising:
   a. performing pulse width modulation within rows within a predefined region of said spatial light modulator; and
   b. operating at least one other region of said spatial light modulator for row integration, wherein said at least one other region does not include said row performing pulse width modulation.

2. The method of claim 1 further comprising the step of performing corrections to said printed image in a further region of said modulator not including said predetermined or said at least one other region, wherein said corrections include adjusting the gray scale of an image by activating selected elements on said spatial light modulator.

3. The method of claim 1 wherein said pulse width modulation is binary pulse width modulation.

4. The method of claim 1 wherein said pulse width modulation is symmetric pulse width modulation.

5. A method of pulse width modulation for gray scale comprising:
   a. loading each element within a row of a spatial light modulator with data corresponding to a predetermined line time interval symmetrical about said line time interval's center; and
   b. resetting said modulator at various time intervals symmetrical about said center, thereby modulating the width of the data pulse over time, wherein said modulated pulses form gray scale images on a photosensitive surface.

6. The method of claim 5 wherein said spatial light modulator is a digital micromirror device.

* * * * *